(No Model.)   5 Sheets—Sheet 1.

A. KATZKY.
FARE RECORDER.

No. 513,462. Patented Jan. 23, 1894.

(No Model.) 5 Sheets—Sheet 2.

A. KATZKY.
FARE RECORDER.

No. 513,462. Patented Jan. 23, 1894.

(No Model.) 5 Sheets—Sheet 5.

A. KATZKY.
FARE RECORDER.

No. 513,462. Patented Jan. 23, 1894.

Attest
Walter Donaldson
H. L. Middleton

Inventor
Abram Katzky
by Ellis Spear
Atty.

UNITED STATES PATENT OFFICE.

ABRAM KATZKY, OF MOSCOW, RUSSIA.

FARE-RECORDER.

SPECIFICATION forming part of Letters Patent No. 513,462, dated January 23, 1894.

Application filed April 13, 1893. Serial No. 470,153. (No model.)

*To all whom it may concern:*

Be it known that I, ABRAM KATZKY, of Moscow, in the Empire of Russia, have invented a new and useful Improved Fare-Recorder for Public Vehicles, of which the following is a specification, reference being had therein to the accompanying drawings.

This invention relates to apparatus for indicating and registering the time during which a public vehicle has been occupied by a passenger. Similar devices hitherto constructed have as a rule only been applicable to cabs and similar wheeled vehicles, but an apparatus constructed according to this invention is applicable to all vehicles whether cabs, sledges, or boats. An apparatus so constructed is electrically controlled, the circuit being closed and opened upon the passenger depressing some portion of the framing of the vehicle, preferably the seat.

The apparatus will be described as operated from the seat of the vehicle; but, it will be obvious that it can as easily be operated from some other part of the vehicle such as the floor.

The apparatus consists essentially of a clock furnished with a removable cardboard dial divided into hours or other time units. Two electro magnets are combined with the clock, one of which is energized upon the passenger taking his seat, and moves a pencil into contact with the revolving dial. The second electro magnet is energized upon the passenger rising and removes the pencil from the dial. The time during which the passenger has occupied the vehicle or the fare due from him is thus indicated.

The accompanying drawings, reference to which is hereinafter made, illustrate in what manner my invention may be carried into effect.

Figure 1:
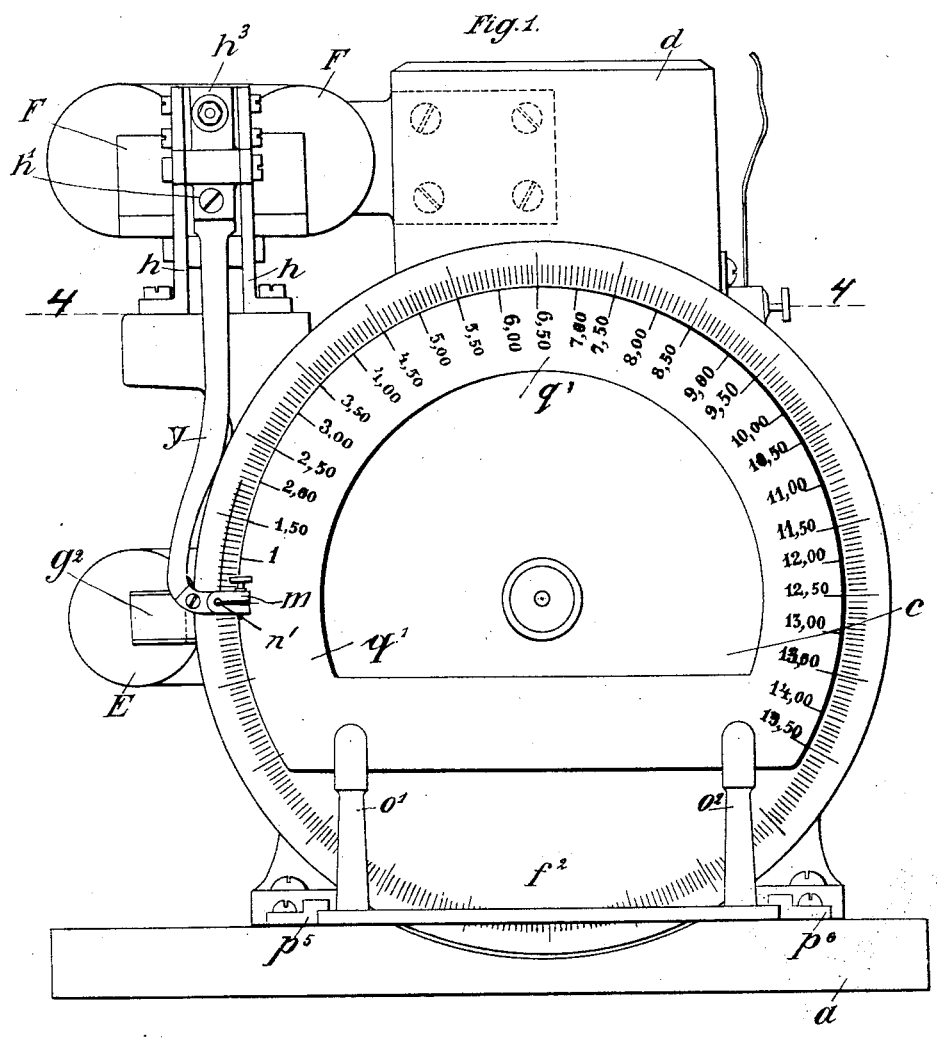
Figure 2:
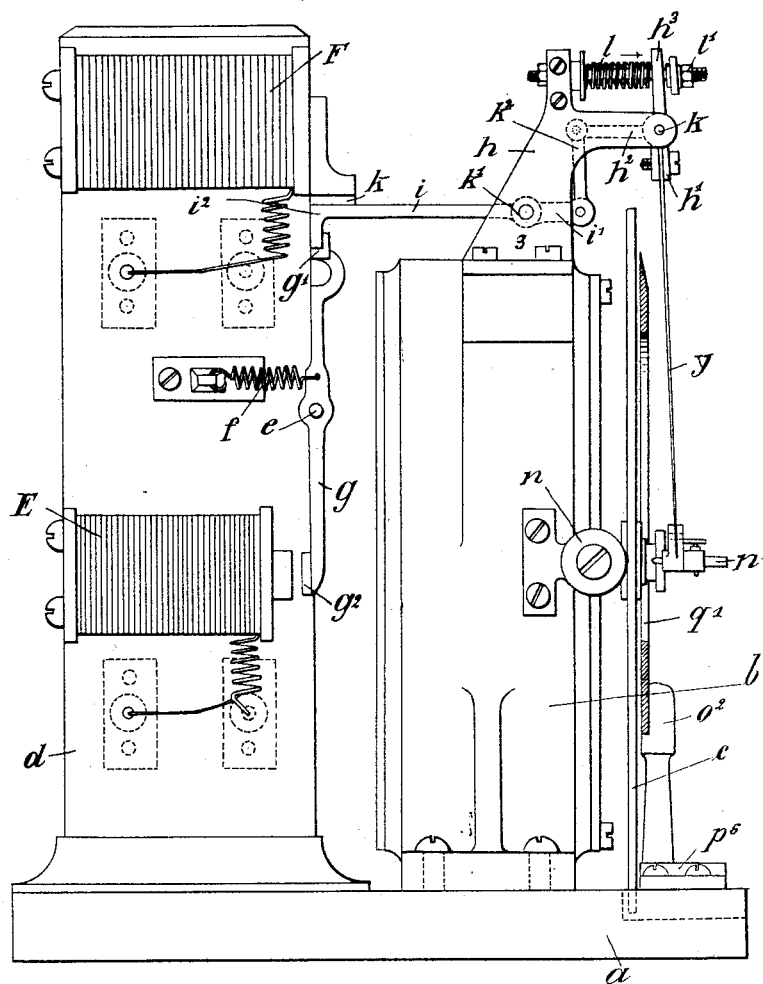
Figure 3:
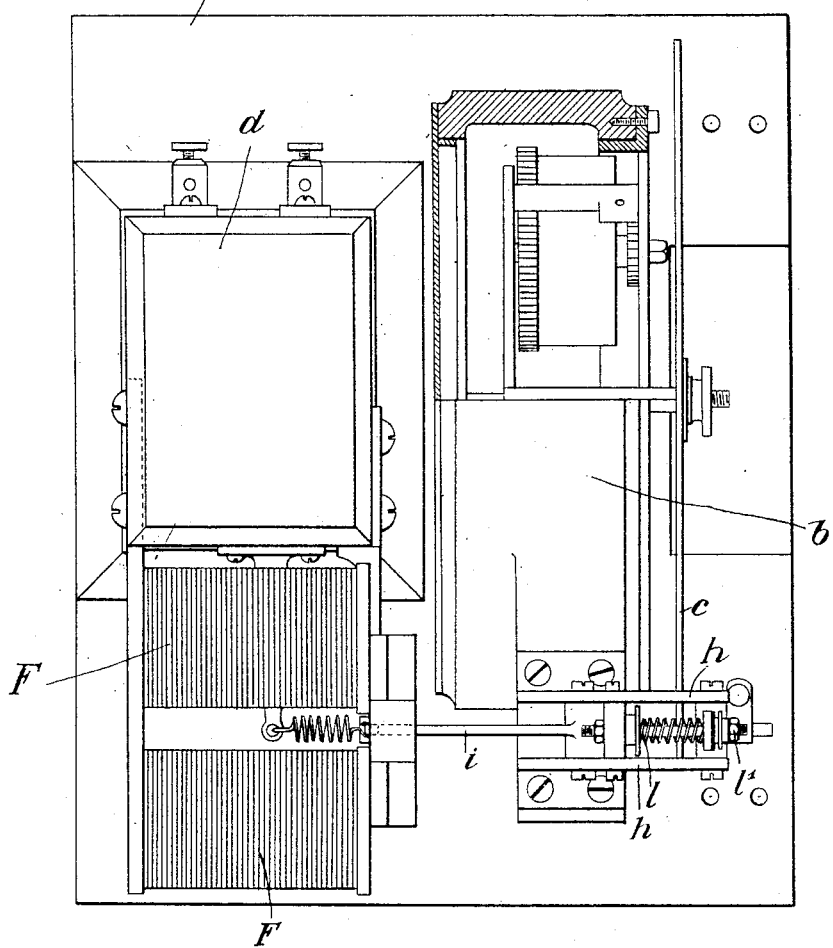
Figure 4:
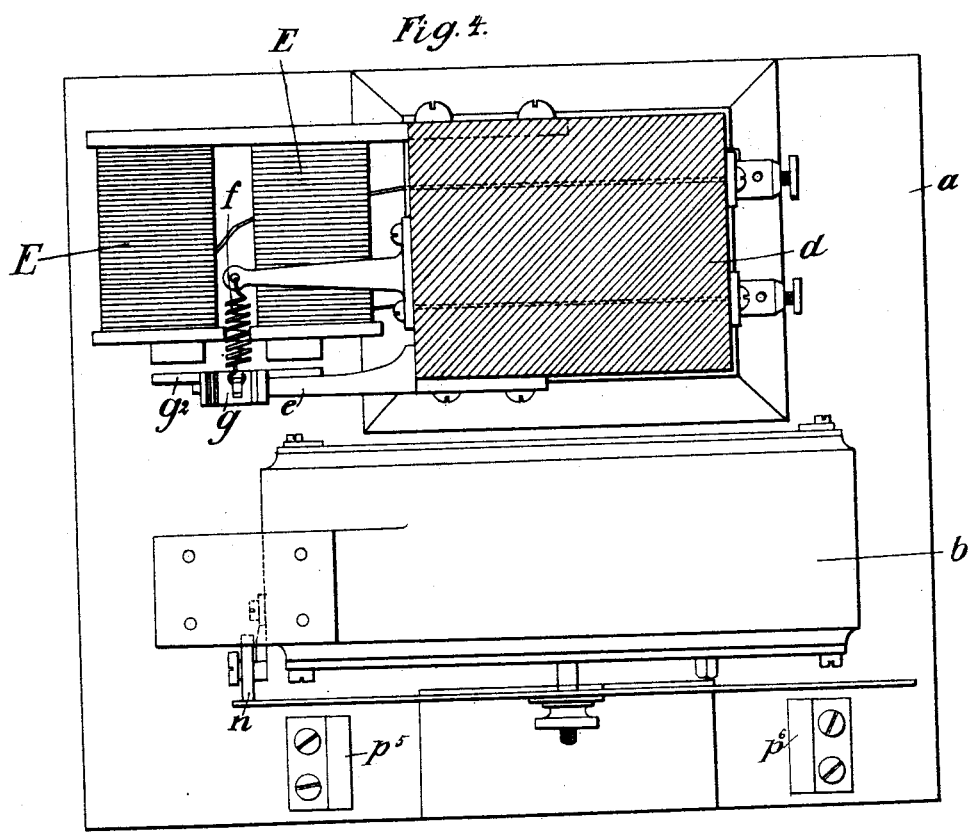
Figure 5:
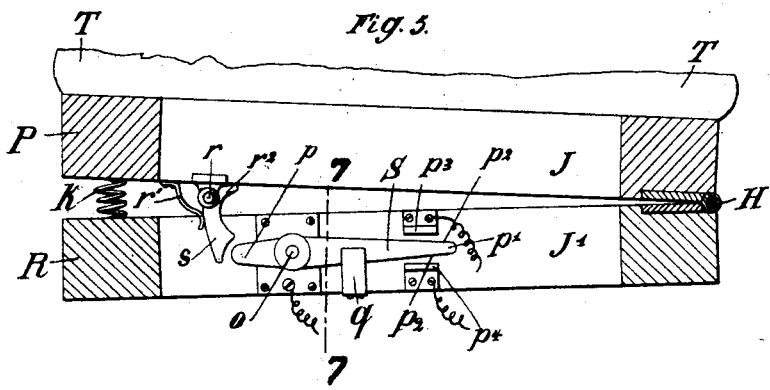
Figure 7:
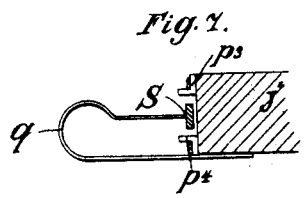
Figure 6:
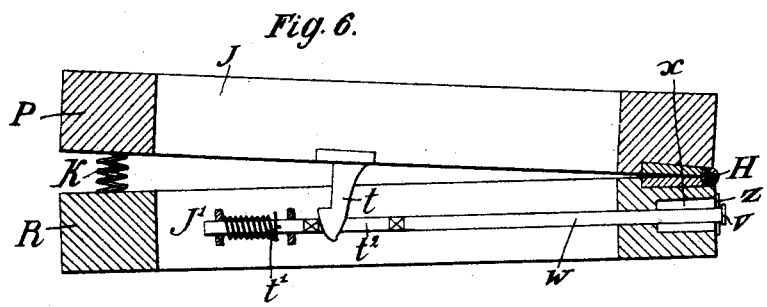
Figure 8:
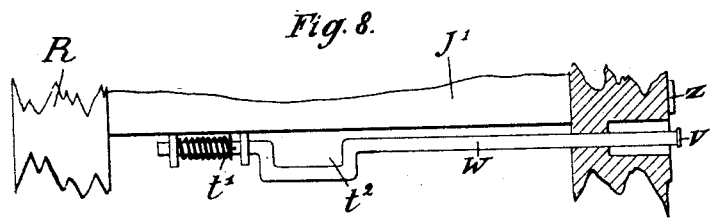

Figure 1 illustrates a front elevation of the indicating apparatus. Fig. 2 represents the apparatus in side elevation. Fig. 3 shows it in plan. Fig. 4 is an illustration of a section taken along the line 4—4 Fig. 1. Fig. 5 represents a section of the seat and seat frame showing the electrical contacts. Fig. 6 shows the mechanism for locking the seat in place. Fig. 7 is a section along the line 7—7 Fig. 5. Fig. 8 is a plan of the mechanism shown in Fig. 6.

Upon the base plate $a$ are secured a clock $b$ with an exchangeable dial $c$ of stout paper and a pedestal or bracket $d$. This bracket carries two electro magnets E F. The lever $g$ which is pivoted at $e$ and controlled by the spring $f$ is provided on one end with a nose or projection $g'$ and on its other end with an armature $g^2$. The clock case also carries a frame $h$ upon which the three armed lever $h'$ $h^2$ and $h^3$ and the unequal double armed lever $i$ $i'$ are pivoted at $k$ $k'$ respectively. The arm $i$ of the two armed lever is provided with an angular portion $i^2$ which engages with the projection $g'$ of the lever $g$ and also carries an armature $k$. The other arm $i'$ of the same lever is joined to the arm $h^2$ of the three armed lever by means of the rod or link $k^2$. The arm $h^3$ is actuated by the spring $l$ in the direction of the arrow and the arm $h'$ carries an elastic finger $y$ provided with the pencil $n'$. The roller $n$ supports the dial $c$ against the pressure of the pencil.

The contact mechanism which closes the electrical circuit for actuating the control apparatus consists of the following parts: In the frame J' of the conveyance, see Figs. 5 and 7, a contact lever S pivoted at O is arranged upon the cross bar J'. This lever S has unequal arms $p$ and $p'$ the arm $p'$ carrying two contact points $p^2$ which can come into contact intermittently with the plates $p^3$ and $p^4$ upon the cross bar J'. By means of the spring $q$ (Figs. 5 and 7) the contact lever S is held in its middle position as it is necessary to balance the lever on account of the disturbing jerks and vibrations during the journey.

The cushion frame P carrying the cushion T is fixed upon the seat frame R by means of the hinge H and is held apart from the frame a certain distance by the coiled spring K. A cross bar J of the frame P carries a lever $s$ pivoted at $r$ and held in its normal position by the spring $r'$ and nose $r^2$. The dimensions and forms of the lever are such that it only comes into contact with the arm $p$ of the lever S during the middle position of seat P T during the downward motion pressing the arm $p$ down and during the upward motion lifting it up.

To allow of the seat P T being locked or secured upon the seat frame a strong hook $t$ is fixed to the cross bar J, and a rod W with a cranked portion $t^2$ and head $v$ is arranged in the seat frame R which rod is capable of movement in one direction so that when the seat is pressed down the hook $t$ engages with the cranked portion $t^2$ and is held fixed by the rod. To release the seat the rod W by means of the head $v$ is pushed back, so that the head $v$ passes within the opening $x$ of frame R and the slide $z$ is pushed over to close the opening. The rod W may, if desired, be operated from the driver's seat by means of suitable lever mechanism.

In front of the bristol board disk ($c$) is arranged a solid graduated scale ($q'$) supported in its undermost part by two pins ($o'$ $o^2$), which are fastened to a bar ($f^2$) sliding in the rails ($p^5$, $p^6$). The division of the above scale is made in such a manner that the cost of the whole journey, in intervals of a quarter of an hour, can be plainly seen.

The function of the device is as follows: The apparatus is placed where desired in the vehicle and connected with a contact fastened to the seat, and an electrical dry battery. The clock which is combined with this apparatus is provided with a bristol board dial plate, so arranged that the pointed hand stands at zero at the commencement of the journey and indicates the time of the journey. The marking point is located opposite the zero point of the scale of prices and the length of the mark made on the dial when compared with the price scale will indicate the price of the completed journey. If a person intends to use the conveyance and seats himself upon the seat P T the lever $s$ actuates the lever S in such a way that the contact point $p^2$ comes into contact with the plate $p^3$ and then sinks back into its position of rest. During the contact of the parts $p^2$ $p^3$ the circuit is closed and actuates the electro-magnet E. The armature $g^2$ is attracted for a moment by the latter and then released again, which short movement of the lever $g$ is sufficient to release the nose $i^2$. The spring $l$ causes the arm $i$ to fall and presses the finger $y$ inward and the pencil against the dial until a second circuit is established by the passenger leaving his seat again. During this time the pencil $n'$ marks a line upon the dial $c$ which exactly indicates how long the carriage or other vehicle has been occupied and during what time. If the passenger leaves the conveyance the spiral spring K presses the seat up, the lever $s$ actuates the lever S in such a way that the contact points $p^2$ $p^4$ are brought into momentary contact, the electro-magnet F is actuated and the armature $k$ attracted. The movement of the armature $k$ of course also moves the lever $i$ $i'$ and the locking piece $i^2$ and the lever $g$ by means of the spring $f$ is brought into its normal position and locks the nose $i^2$ by means of the part $g'$. By means of the movement of the lever $i$ $i'$ the finger $y$ with the pencil $n'$ is withdrawn from the dial $c$ and the diagram interrupted, so that it can be seen distinctly how long the conveyance has been used. At the next occasion the process described above is repeated. The dial plate ($c$) travels with the same velocity as the hour hand of a clock and in the same direction and therefore, the mark of the pencil point $n'$ is made at the same rate as shown in Fig. 1 of the annexed drawings until a fresh fare enters, when a new mark is made.

During the time the carriage is not used, a blank space appears on the bristol board. At the beginning of the journey the coachman turns the dial plate so that the pencil point shows the time of the commencement of the journey. Every twelve hours a new cardboard dial plate is inserted so that there is a complete and accurate record of how often and how long the carriage was used.

If the carriage or sledge be hired out for a whole day or for several hours, the slide $z$ of the seat frame R is pushed back and the locking arrangement $t$ $t'$ $t^2$ and W is brought into action, so that a continuous diagram is marked, and any time, during which the conveyance has been kept waiting is likewise reckoned.

The pressure of the spring $l$ may be regulated by means of the nut $l'$.

What I claim as my invention, and desire to secure by Letters Patent, is—

1. A fare recorder for vehicles comprising a dial with suitable mechanism for rotating the same, an arm depending in front of said dial carrying a marking point, an electro magnet with electric connections to the seat for causing said point to contact with the dial when said seat is taken, and a second magnet with connections whereby said point is removed from the dial, substantially as described.

2. In a fare recorder a clock mechanism, a removable card board dial rotated thereby, an arm depending in front of said dial carrying a marking point, an electro magnet and connections operated by a person taking the seat to cause said point to contact with the dial and remain thereon while the seat is occupied, a second magnet with connections operated automatically when the seat is vacated to remove said point from the dial, substantially as described.

3. In a fare recorder in combination with a revolving graduated dial and an electrically operated marking point co-operating therewith an independent price indicating scale located in proximity to said dial, substantially as described.

4. In combination with the clock mechanism, the revolving dial removably mounted upon the hour spindle thereof, the marking point with operating connections therefor, and the price indicating scale located in close proximity to the dial and movable toward and from the same, substantially as described.

5. In combination with the recording mechanism, the pivoted spring supported seat having electrical connections to said mechanism whereby the mechanism is operated while the seat is occupied, and means for holding said seat depressed when the recording mechanism is out of operation, consisting of a rigid hook depending from the seat, a horizontally reciprocating rod under spring tension having an angular portion engaging said hook, said rod having its end extended through a recess in the seat frame to provide an operating handle, substantially as described.

In witness whereof I have hereunto set my hand in presence of two witnesses.

ABRAM KATZKY.

Witnesses:
  PAUL FISCHER,
  HEINRICH GLUNICK.